Figure 1:
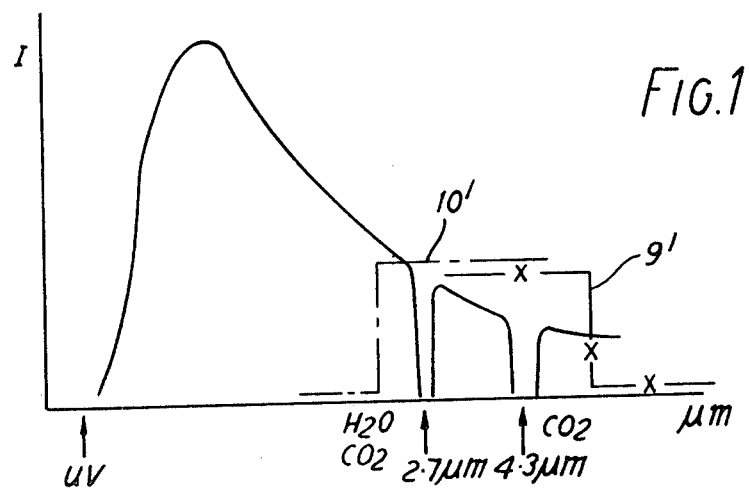

United States Patent [19]

Middleton et al.

[11] Patent Number: 4,471,221

[45] Date of Patent: Sep. 11, 1984

[54] INFRA-RED FLAME DETECTOR

[75] Inventors: John F. Middleton, Sunbury-on-Thames; Roger Barrett, Watford; Terence A. Garrett, Staines, all of England

[73] Assignee: EMI Limited, Hayes, England

[21] Appl. No.: 369,083

[22] Filed: Apr. 16, 1982

[30] Foreign Application Priority Data

Apr. 16, 1981 [GB] United Kingdom ............... 8112052

[51] Int. Cl.³ ............................................. G01J 1/00
[52] U.S. Cl. ................................... 250/339; 340/578
[58] Field of Search ............. 250/339, 338, 349, 554; 340/577, 578

[56] References Cited

U.S. PATENT DOCUMENTS 3,931,521 1/1976 Cinzori ................................. 250/339
4,206,454 6/1980 Schapira et al. ................ 250/339 X
4,249,168 2/1981 Muggli ............................ 250/339 X
4,296,324 10/1981 Kern et al. ......................... 250/339

FOREIGN PATENT DOCUMENTS 1550334 6/1975 United Kingdom .

Primary Examiner—Davis L. Willis
Attorney, Agent, or Firm—Fleit, Jacobson, Cohn & Price

[57] ABSTRACT

A flame detector arranged to detect flames includes a non-microphonic infra-red sensor having a broad band frequency response. To maximize the sensitivity to radiation from flames in the 4.3 μm solar absorption band a narrow band optical interference filer, transmissive in the band 4.54 μm to 4.38 μm is chosen such that the integrated solar energy transmitted thereby is less than an alarm threshold.

A further filter prevents re-radiated heat from the filter reaching the sensor. Another filter prevents radiation of wavelengths less than 4.38 μm from reaching the other filters to reduce heating thereof and also to provide a series of filters to stop direct broad band transmission to the sensor through pin holes in the filters. A signal processor detects flames by virtue of the flame flicker frequencies and includes provision for compensating for the effects of low frequency components on the amplitude of radiation produced by flames.

17 Claims, 11 Drawing Figures

INFRA-RED FLAME DETECTOR

The present invention relates to a flame detector.

It is known to detect flames by virtue of the infra-red radiation which they emit and by virtue of the flickering of the infra-red radiation produced by the flames. Although the infra-red flame detectors which have been used exhibit high sensitivity to flames, they also respond in varying degrees to infra-red sources other than flames and particularly to solar radiation. Careful siting of such detectors can reduce false alarms, but in some circumstances they cannot be used because of spurious sources.

Consequently, flame detectors responsive to ultra-violet radiation have been widely used, as they are less affected by the spurious sources which cause false alarms with the known infra-red detectors. Ultra violet detectors are, however, very sensitive to arc-welding, an activity which is common place on oil rigs or in chemical processing plants and oil refineries, where flame detection is especially important. Thus ultra-violet detectors are very susceptible to false alarms generated by arc-welding. In addition they are troubled by window contamination, particularly by thin oil films and smoke, and are less sensitive to flames than infra-red detectors. Such disadvantages can be reduced by techniques such as using two ultra violet detectors, one of which surveys an area to be protected and the other of which surveys the background. The outputs of the two detectors are compared. Such a technique however increases the cost of a flame detector and is also susceptible to false alarms due to reflections of arc-welding radiation.

Nevertheless, the known infra-red detectors are widely regarded as unsatisfactory where they are used in areas in which solar radiation is present, in particular outdoors, and many more ultra-violet detectors have been installed, despite their disadvantages, on oil rigs, in oil refineries and in other plant where flame detection is important. Practical experience of the use of the ultra-violet detectors has shown they too are unsatisfactory due to the disadvantages specified above.

British Pat. No. 1,550,334 discloses a flame detection apparatus arranged to detect the presence of flames, the apparatus including detector means arranged to receive radiation from flames, the detector means being responsive substantially only to radiation having a wavelength in the range from 4.19 $\mu$m to 4.45 $\mu$m inclusive. A specific example is sensitive in the range 4.25 $\mu$m to 4.45 $\mu$m. The wavelengths in the range from 4.19 $\mu$m to 4.45 $\mu$m are chosen because solar radiation in that range is strongly absorbed by the earths atmosphere, whereas infra-red radiation emitted from hydrocarbon flames exhibits a peak within the same range. Thus, underlying the specified range of wavelengths is the need to reliably avoid detecting radiation from the sun and the range is chosen to be well within the band of absorption of solar radiation by the atmosphere.

The resulting detector is workable and useful but its application is limited by its narrow field of view and temperature sensitivity.

According to the present invention there is provided a flame detector arranged to receive radiation from flames and responsive to radiation in a range having an upper wavelength of 4.46 $\mu$m to 4.65 $\mu$m at which detector response is substantially half peak detector response, and having a lower wavelength at which said response is substantially half said peak response within the band of absorption of solar radiation by the atmosphere, which band is centred on a wavelength of about 4.3 $\mu$m, and the detector being arranged so that it is unresponsive to the total solar radiation within and outside the said range.

According to another aspect, there is provided a flame detector comprising a sensor sensitive to infra-red radiation over a broad band width to produce an electrical output;

signal processing means connected to receive said output for producing therefrom an indication of the presence of flames; and a narrow band filter arranged to transmit to the sensor radiation having wavelengths only in a range having an upper wavelength of 4.46 $\mu$m to 4.65 $\mu$m at which detector response is substantially half peak detector response, and having a lower wavelength at which said response substantially is half said peak response within the band of absorption of solar radiation by the atmosphere, which band is centred on a wavelength of about 4.3 $\mu$m, and chosen so that the total solar radiation which the filter transmits to the sensor is insufficient to cause said signal processing means to indicate the presence of flames.

The said upper wavelength may be 4.5 $\mu$m to 4.6 $\mu$m and is preferably 4.52 $\mu$m to 4.56 $\mu$m.

The chosen range allows an increased field of view by extending the upper wavelength of the range into the region of the spectrum where there is solar energy. The detector is still unresponsive to solar energy because the alarm threshold of the signal processing means is greater than the level of the integrated solar energy, when 100% modulated, transmitted to the sensor via the narrow band filter.

An embodiment of the flame detector comprises an infra-red sensor which produces an electrical output in response to infra-red radiation, and a narrow band filter transmissive to infra-red radiation in the said range. An example of such a filter may absorb radiation outside the range. Heat from the absorbed radiation may reach the sensor by radiation or conduction away from the filter, and cause a spurious electrical output.

Thus in a modification a further filter is provided between the narrow band filter and the sensor to prevent re radiation and/or heat transfer from the narrow band filter to the sensor. This filter may be of material transmissive to wavelengths less than 6.5 $\mu$m; e.g. Sapphire.

In another modification another filter is provided to absorb radiation of wavelengths shorter than the said lower wavelength of the said range to reduce the absorption of energy by the narrow band filter. A material such as Germanium which does not transmit radiation of wavelengths below which there is significant solar energy e.g. 1.5 $\mu$m or shorter, may be used as this filter.

Furthermore some types of filters tend to have very small pinholes which are fully transmissive. By providing several filters in series, i.e. the narrow band filter, the further filter and the another filter, the chance of the full transmission directly to the sensor is reduced to an insignificant level. A Germanium filter is useful in this context as it does not have pinholes, by its nature.

In order to detect flames, the electrical output of the transducer is processed to detect the presence of flicker in the received radiation. Conventionally, the processing detects the average amplitude, over a set time period, of signals having frequencies in the range 4 Hz and above. If the average amplitude exceeds a threshold an indication of the presence of flames is produced. Such processing can be used in the present invention. However the inventors have found that due to low frequency components of the flicker spectrum of flames the amplitude of the electrical output of the transducer irregularly can become so small for such a period as to maintain the said average amplitude below the threshold. Thus no flame indication is produced.

Thus in an embodiment of the invention the signal processing means comprises means for producing a signal indicative of whether the rate at which the amplitude of the said electrical output crosses a threshold level exceeds a preset rate, the means being arranged to at least maintain its value after each said crossing for a preset time period dependent on the time for which the said amplitude is likely to be less than the threshold level due to the low frequency components, and means for producing an indication of the presence of flames if the said signal indicates the said rate exceeds the preset rate for a predetermined time.

In a preferred embodiment the signal processing means comprises filter means to select frequency components in a preset range, means for producing a first signal of value which varies in a first sense at a predetermined rate, means for producing a signal indicative of whether the rate at which the amplitude of the selected frequency components crosses a threshold level exceeds a preset rate, and means for resetting the value of the first signal to a preset level if the period between a said crossing and its succeeding crossing exceeds a predetermined amount dependent on the time for which the amplitude of the said selected frequency components is likely to be less than the threshold due to the low frequency components.

Figure 2:
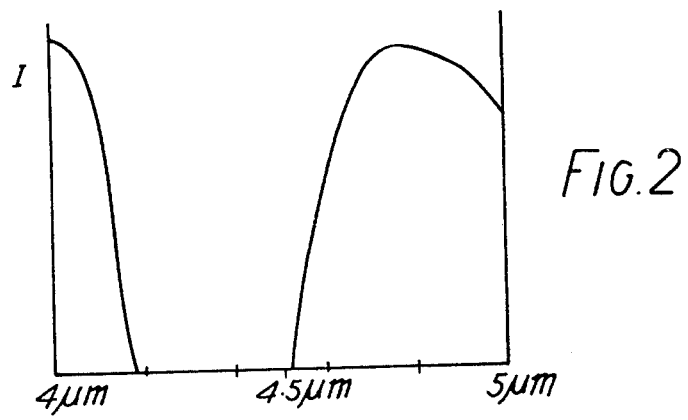
Figure 3:
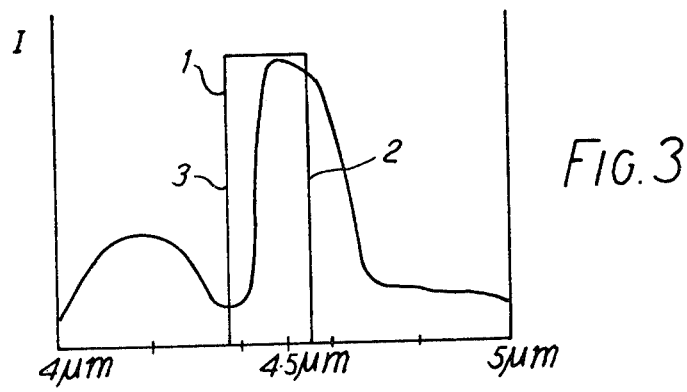
Figure 4:
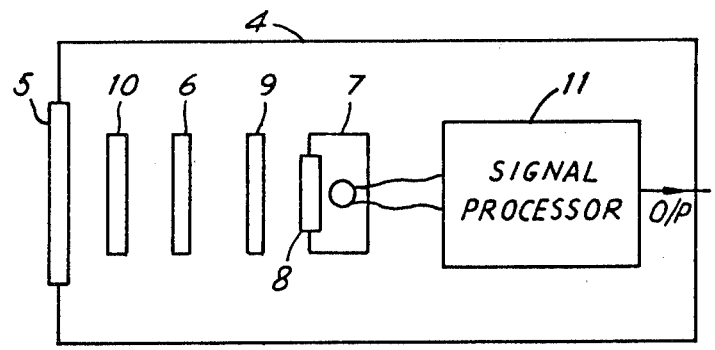
Figure 5:
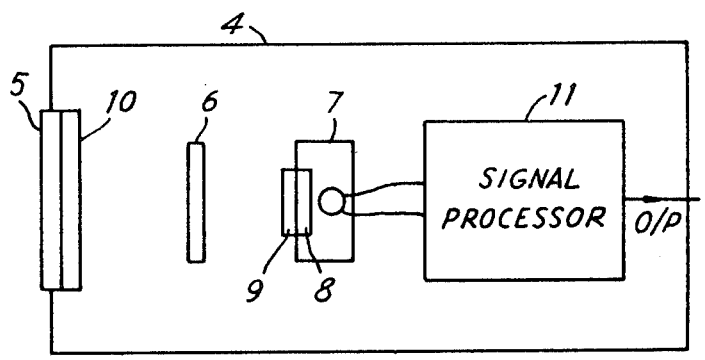
Figure 6:
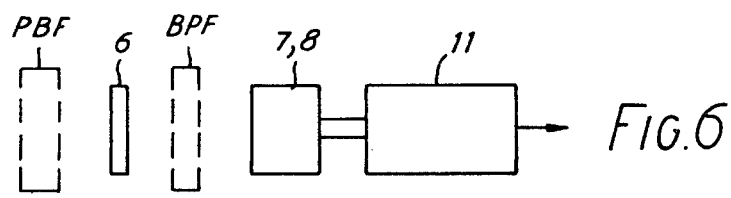
Figure 7:
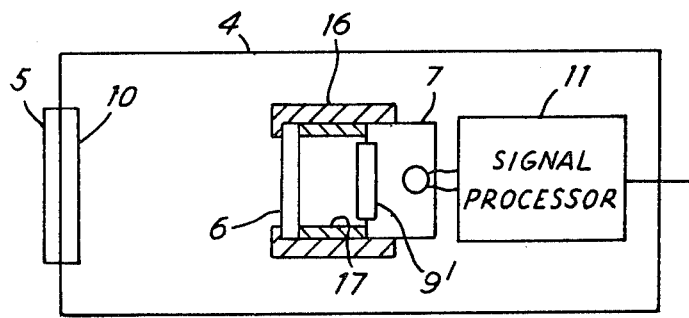
Figure 8:
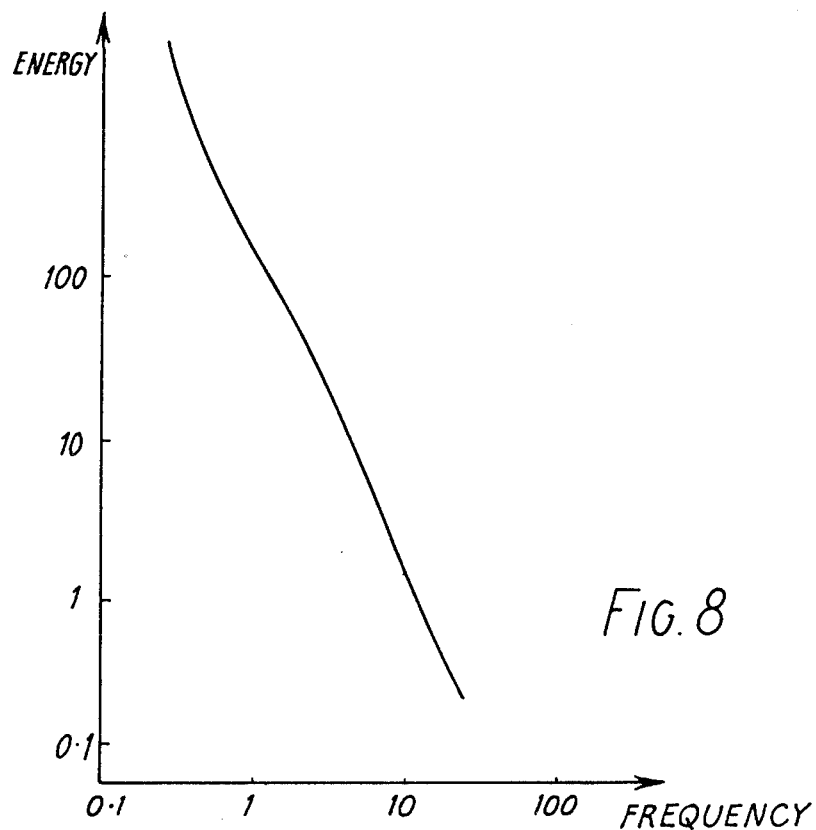
Figure 9:
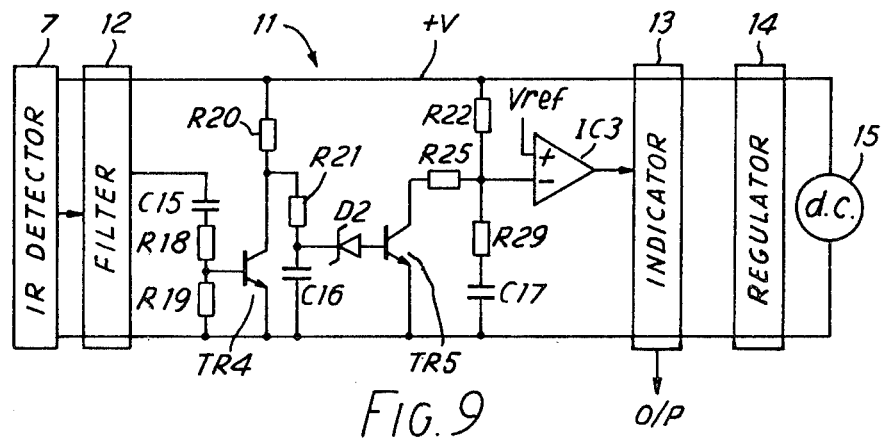

For a better understanding of the invention, and to show how the same may be carried into effect, reference will now be made, by way of example, to the accompanying drawings, in which:

FIG. 1 is a schematic representation of the spectrum of solar radiation subject to atmospheric absorption, FIG. 2 is a schematic representation of the 4.3 μm absorption band, FIG. 3 is a schematic representation of radiation from flames in the 4.3 μm band, FIG. 4 is a schematic representation of an example of a flame detector in accordance with the invention, FIG. 5 is a schematic representation of a modification of the flame detector of FIG. 4, FIG. 6 is a schematic representation of another example of a flame detector, FIG. 7 is a schematic representation of a preferred embodiment of a flame detector, FIG. 8 is a schematic representation of the spectrum of flicker of flames, FIG. 9 is a schematic circuit diagram of the flame detector of FIGS. 4, 5, 6 or 7 and FIGS. 10A and 10B comprise idealised waveform diagrams illustrating the operation of the circuit of FIG. 9.

Referring to FIG. 1, the spectrum of radiation from the sun is subject to absorption in the atmosphere at several wavelengths only a few such wavelengths being shown in the figure. In a band of wavelengths centred on about 2.7 μm absorption is caused by carbon dioxide ($CO_2$) and water ($H_2O$) and in a band centred on about 4.3 μm, absorption is caused by carbon dioxide ($CO_2$) in the atmosphere.

Flames associated with hydrocarbon sources emit radiation in the $CO_2$ bands. As shown in more detail in FIG. 2 the 4.3 μm absorption band has an abrupt transition from absorption to transmission at the upper (5 μm) wavelength end of the band and a transition at the lower (4 μm) wavelength end. As shown in FIG. 3, the intensities I of radiation from flames falling in the 4.3 μm absorption band have a small peak near the lower wavelength end of the band, with a trough in approximately mid-band due to absorption of the radiation in the atmosphere, and a large peak close to the said transition at the upper 5 μm wavelength end of the band, the radiation from the flame overlapping to some extent the transition into the region where solar radiation is not absorbed.

Thus in accordance with the invention, a flame detector is arranged to receive radiation from flames and is responsive to radiation in a range having an upper wavelength of 4.46 μm to 4.65 μm at which the response is half the peak response and having a lower wavelength, at which the response is half the peak response, within the band of absorption of solar radiation by the atmosphere which band is centred on a wavelength of about 4.3 μm and arranged so that it is unresponsive to the total solar radiation within and outside the band. The upper wavelength may be 4.5 μm to 4.6 μm. In a preferred example of the flame detector, the said lower wavelength is 4.38 μm. An example of such a detector comprises a narrow band optical interference filter having an idealised filter response pattern as shown at 1 in FIG. 3. The response 1 illustrates that the half peak transmission point 2 for the upper wavelength is at 4.54 μm and the half peak transmission part 3 for the lower wavelength is at 4.38 μm. Radiation is transmitted to an infra-red sensor the electrical output of which is fed to a signal processor, which indicates the presence of flames if an alarm threshold (amongst other things) is exceeded.

All optical interference filters have a shift to shorter wavelength $\lambda_1$ with an angle of incidence deviating from the normal given by $$\lambda_1 = \lambda_o(n^2 - \sin^2 i)^{\frac{1}{2}}/n$$

where
i = angle of incidence,
$\lambda_o$ = wavelength at normal incidence, and
n = effective refractive index of the filter.

The field of view is thus increased by extending the upper wavelength into the region where there is solar energy and a detector which does not respond to solar energy is still obtained, provided the integrated energy (100% modulated) transmitted to the sensor via the optical filter is less than the alarm threshold. The upper wavelength chosen depends upon:

(a) The fire sensitivity required
(b) The solar response required (This is related to the filter wavelength shift with angle characteristics)
(c) The shape of the filter slope
(d) The temperature range required (and how the filter pass band shifts with temperature) and
(e) The tolerances on the filter manufacture.

In the preferred embodiment 4.54 μm has been chosen as the upper wavelength half power point.

The lower wavelength half power point is chosen such that the wavelength shift with angle for a high angle of incidence will not shift the lower wavelength edge in the solar region below 4.17 μm. In the preferred embodiment this is achieved by choosing the lower wavelength half power point of 4.38 μm.

In this way the flame detector has a significantly wider field of view than the flame detector of British Pat. No. 1,550,334 and is less sensitive to temperature changes.

An example of a flame detector is shown in FIG. 4. It comprises a sealed enclosure 4 having a broad band window 5 of e.g Germanium, Silicon or Sapphire, which is transmissive to infra-red radiation at least in the 4.3 μm band. Within the box is the aforementioned narrow band optical interference filter 6 and a non-microphonic infra-red sensor 7 which produces an electrical output in response to infra-red radiation over a broad bandwidth. An example of such a sensor comprises Lead Selenide, or a pyroelectric sensors such as Lithium-Tantalate. It comprises a box having a broadband window 8 of material transparent to infra-red radiation, e.g. Germanium, Silicon or Sapphire. A signal processor 11 processes the output of the sensor 7 to produce a flame indication.

The narrow band filter 6 is transmissive over the range specified above and blocks energy outside that range. Some of the energy however is absorbed, causing a variation in the temperature of the filter. This variation can be sensed by the sensor 7 causing a spurious output from the processor 11 which responds to signal variation. In order to avoid this, filter 6 could be massive in order to have a large thermal inertia and so not vary in temperature. However, in FIG. 4 a further filter 9 is placed between the narrow band filter 6 and the sensor 7 to prevent radiation from the hot filter 6 reaching the sensor 7 and to prevent conduction from the filter 6 to the sensor 7. As the radiation re-radiated from the hot filter 6 is at long wavelengths the filter 9 has a filter response as shown at 9 in FIG. 1, with a transition from transmission to absorption at for example 5 μm or 6 μm.

A further problem which occurs is that the solar spectrum has a large amount of energy at wavelengths shorter than the 4.3 μm band. Also practical interference filters tend to have pin-holes which transmit radiation over the range of wavelengths shorter than the 4.3 μm band. Thus a filter 10 is provided having a response as shown at 10′ in FIG. 1 to transmit only wavelengths longer than about 1.5 μm to prevent most of the energy reaching the detector 7.

A series of several filters 10, 6, 9 reduces the chance of radiation outside the desired transmission band of 4.36 μm to 4.54 μm reaching the detector through pin holes to an insignificant level.

It is in fact unnecessary to have separate windows 5 and 8 and filters 10, 6 and 9. Furthermore, if filter 10 is provided so that filter 6 does not absorb a substantial amount of radiation, filter 9 could be left out.

Referring to FIG. 5, the filter 10 is incorporated with the window 5 being formed by a coating on the window 5. Similarly the filter 9 is incorporated with window 7. In this example, the narrow band filter 6 remains a separate element.

A possibility shown in FIG. 6 is to provide the narrow band filter 6 which provides fine control of the wavelengths passed to the sensor 7, 8 and a further band pass filter BPF which is substantially transmissive only within a coarse range wholly within which the narrow band filter is transmissive. The pass band filter PBF may be between the narrow band filter 6 and the sensor 7, 8 or remote from the sensor 7, 8. The two dashed blocks in FIG. 6 illustrate the latter case.

FIG. 7 shows a preferred embodiment in which the window 5 is of sapphire for physical strength, and is coated with Germanium to form the filter 10 which blocks short wavelengths of 1.5 μm or shorter. The window 8 of the sensor 7 is formed of a broad-band filter 9′ (e.g. 4.2 μm to 4.7 μm pass band) which prevents secondary radiation and conduction from the narrow band filter 6 affecting the sensor 7. The filter 6 is held in a tube 16 which is a light-tight fit on the box of the sensor being spaced from the box by a ring 17.

Other variations (not shown) are also possible. For instance it may not be essential to interpose filter 9 between the filter 6 and the sensor 7. Filter 6 could form the window 8 of the sensor, and filters 9 and 10 combined to form the window 5 or filters 6 and 9 combined to form the window 8 of the sensor. Yet further filter 6 could form the window 5, filter 9 the window 8, and filter 10 could be a separate element between filters 6 and 9.

The electrical output of the sensor 7 is fed to a signal processor 11. The signal processor may process the electrical output in known manner. For example the processor detects the presence of flickering in the infra-red radiation at frequencies, typically 4 Hz and above, associated with the flickering of flames. The average amplitude of the flicker frequencies over a set time is sensed and compared with a threshold. If the threshold is exceeded an indication of the presence of flames is produced. This indication may be electrical, visual, and/or audible.

The inventors have found that the conventional processing is subject to errors due to low frequency components in the flicker spectrum.

Figures 10A, 10B:
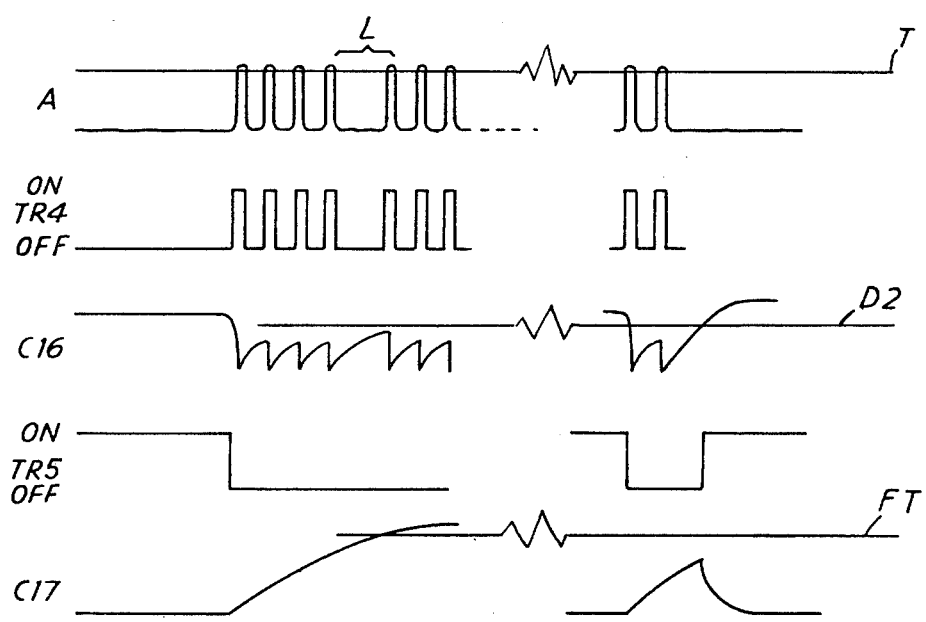

Referring to FIG. 10A, waveform A schematically illustrates an electrical signal produced by flame. It is apparent that the peaks of the signal exceed a threshold T, except over a period L, where the amplitude of the signal is very low due to the low frequency components. The periods such as L occur irregularly. Such periods cause the average amplitude of the flicker frequencies over the set time to be less than the threshold value in the conventional processing.

A preferred signal processor shown in FIG. 9, is designed to reduce the problems caused by the low frequency components.

Referring to FIG. 8, the general trend of the spectrum of flicker frequencies is schematically shown on a Log-Log scale. Much of the energy is concentrated around very low frequencies i.e. DC to 5 Hz.

In the circuit of FIG. 9, the electrical output of the infra red sensor 7 is fed to a filter circuit 12 which outputs the frequency components in the range e.g. 1 Hz to 10½ Hz, (in contrast to the conventional 4 Hz and above).

Referring to FIGS. 9 and 10A, the filtered output produced from waveform A is applied to a transistor TR4 which becomes conductive each time a threshold T is exceeded. A capacitor C16 is connected via resistors R21 and R20 to be charged from a positive rail +V at a rate defined principally by R20.C16 whilst TR4 is non conductive, then discharges very quickly through TR4 at a rate defined by C16.R21. Thus capacitor C16 charges up when TR4 is off and discharges when TR4 is on as shown on part C16 of FIG. 10A. If the amplitude of the output of the filter 12 remains below the threshold T, e.g. for the period L due to the effects of wind, the capacitor C16 continues to be charged, because TR4 is off.

A capacitor C17 is also connected by resistors R29 and R22 to the positive rail +V to be charged at a rate defined principally by R22.C17, this rate being much, e.g. 10 times, slower than the rate of charging of C16. A transistor TR5 is connected across C17, the base of TR5 being connected to C16 via a zener diode D2, so that C17 discharges through TR5 when the voltage on C16 exceeds a further threshold D2 set by diode D2.

Thus providing the voltage on C16 does not exceed the further threshold D2, C17 is continuously charged, despite periods such as L, until an alarm threshold FT is reached. This alarm threshold is set by a voltage V ref fed to one input of a comparator IC3, the other input of which is connected to the junction of resistors R22 and R29 to sense the voltage on C17.

Referring to FIG. 10B if the output of the filter remains low for a predetermined time, signifying no flames, the capacitor C16 charges until the further threshold D2 set by Zener diode D2 is exceeded. TR5 then turns on and capacitor C17 discharges through it. The capacitor C16 will charge up to the threshold D2 much more quickly than the capacitor C17 charges up to FT.

Thus in the absence of flames the output of the filter remains low for a long time, C16 charges up to greater than D2, TR5 remains on, and C17 remains discharged.

An indicator 13 responds to the comparator circuit IC3 to produce an electrical, visual and/or audible warning of flames.

The signal processor is powered via a regulator circuit 14 from a DC power supply 15.

What we claim is:

1. A flame detector arranged to receive radiation from flames and responsive to radiation in a range having an upper wavelength of 4.46 μm to 4.65 μm at which detector response is substantially half peak detector response, and having a lower wavelength at which said response is substantially half said peak response within a band of absorption of solar radiation by the atmosphere, which band is centred on a wavelength of about 4.3 μm, and the detector being arranged so that it is unresponsive to the total solar radiation within and outside the said range.

2. A detector according to claim 1, wherein the said upper wavelength is 4.5 μm to 4.6 μm.

3. A detector according to claim 2, wherein the said upper wavelength is 4.52 μm to 4.56 μm.

4. A flame detector comprising:
   a sensor sensitive to infra-red radiation over a broad band width to produce an electrical output;
   signal processing means connected to receive said output for producing therefrom an indication of the presence of flames; and
   a narrow band filter arranged to transmit to the sensor radiation having wavelengths only in a range having an upper wavelength of 4.46 μm to 4.65 μm at which detector response is substantially half peak detector response, and having a lower wavelength at which said response is substantially half said peak response within a band of absorption of solar radiation by the atmosphere, which band is centred on a wavelength of about 4.3 μm, and chosen so that the total solar radiation which the filter transmits to the sensor is insufficient to cause said signal processing means to indicate the presence of flames.

5. A detector according to claim 4, wherein there is included a further filter means substantially transmissive to radiation over a broader range than the said range of the narrow band filter, but wholly including the said range of the narrow band filter, and substantially non-transmissive to radiation outside the broader range, the broader range being chosen to substantially reduce the amount of radiation reaching the said sensor having wavelengths outside the said range of the narrow band filter.

6. A detector according to claim 5, wherein the further filter is on that side of the narrow band filter remote from the sensor.

7. A detector according to claim 5, wherein the further filter means is between the sensor and the narrow band filter.

8. A detector according to claim 5, wherein there is further included a filter arranged to prevent energy re-radiated from the narrow band filter from reaching the sensor.

9. A detector according to claim 8, wherein the filter arranged to prevent energy re-radiated from the narrow band filter from reaching the sensor comprises material transmissive to wavelengths less than 6.5 μm.

10. A detector according to claim 8, wherein there is also included a filter arranged to prevent a substantial proportion of radiation having wavelengths shorter than the said lower wavelength from reaching the narrow band filter.

11. A detector according to claim 10, wherein a filter arranged to prevent a substantial proportion of radiation having wavelengths shorter than the said lower wavelength from reaching the narrow band filter comprises material transmissive to wavelengths greater than 1.5 μm.

12. A detector according to any one of claims 4, 5, 8 or 10, wherein the signal processing means includes filter means to select frequency components of the said electrical output having frequencies in the range 1 Hz to 11 Hz.

13. A detector according to any one of claims 4, 5, 8 or 10, wherein the signal processing means includes means for producing a signal indicative of whether the rate at which the amplitude of the said electrical output crosses a threshold level exceeds a preset rate, the means being arranged to at least maintain its value after each said crossing for a preset time period dependent on the time for which the said amplitude is likely to be less than the threshold level due to low frequency components, and means for producing an indication of the presence of flames if the said signal indicates the said rate exceeds the preset rate for a predetermined time.

14. A detector according to claim 12, wherein the signal processing means comprises:
   means for producing a first signal of value which varies in a first sense at a predetermined rate,
   means for producing an indication of the presence of flames if the value of the first signal reaches a preset threshold value,
   means for producing a signal indicative of whether the rate at which the amplitude of the selected frequency components crosses a threshold level exceeds a preset rate, and
   means for resetting the value of the first signal to a preset level if the period between a said crossing and its succeeding crossing exceeds a predetermined amount dependent on the time for which the amplitude of said selected frequency components is likely to be less than the threshold due to low frequency components.

15. A detector according to any one of claims 4, 5, 8 or 10, wherein the said upper wavelength is 4.5 μm to 4.6 μm.

16. A detector according to claim 15, wherein the said upper wavelength is 4.52 μm to 4.56 μm.

17. A detector according to claim 16 wherein the said range having the said upper wavelength is centred on 4.46 μm and the said lower wavelength is 4.36 μm to 4.40 μm.

* * * * *